May 13, 1924.

A. ZISKA, JR 1,493,513

CLUTCH

Filed Oct. 4, 1919  3 Sheets-Sheet 1

Inventor
Adam Ziska Jr.
By Edwin B. H. Tower Jr.
Atty.

May 13, 1924.  
A. ZISKA, JR  
1,493,513  
CLUTCH  
Filed Oct. 4, 1919   3 Sheets-Sheet 2
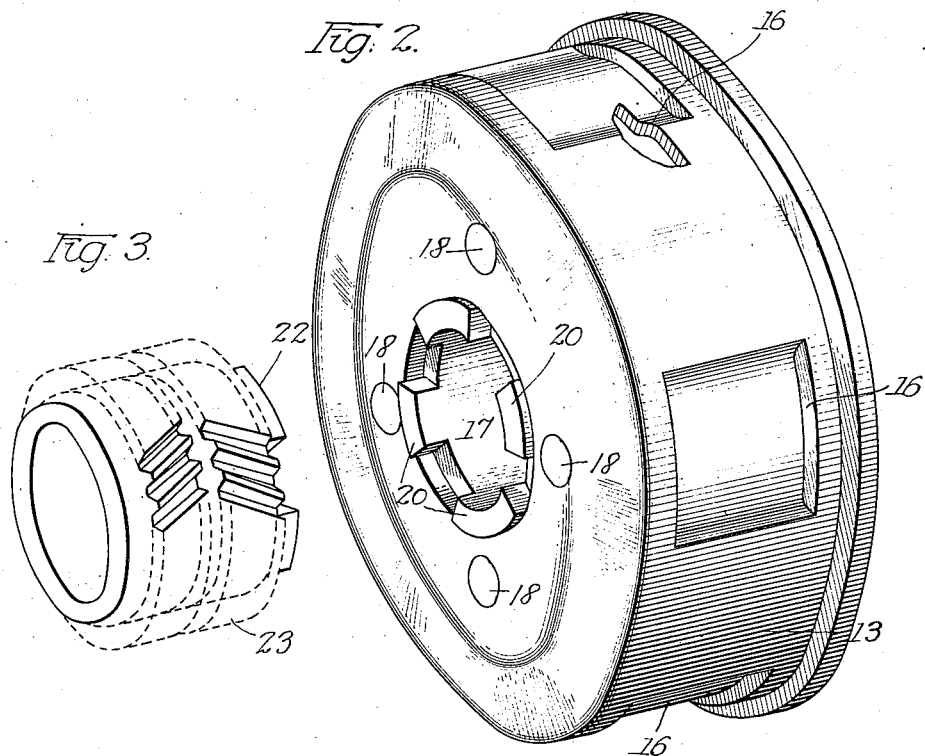
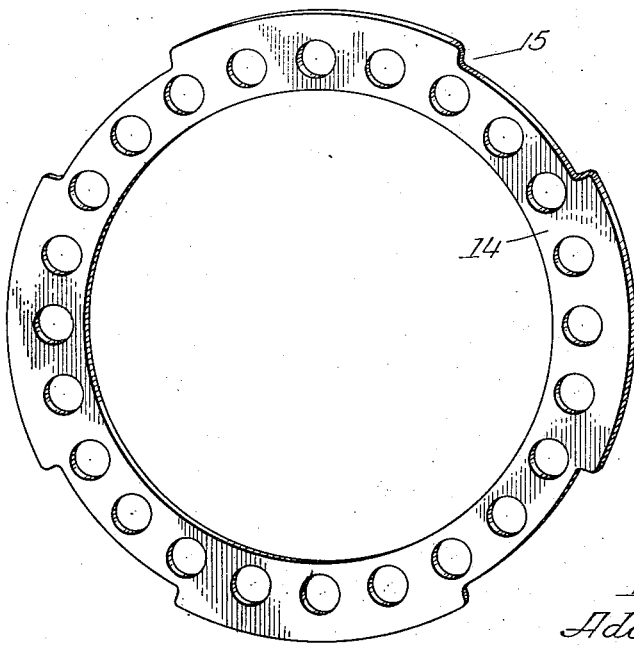
Inventor  
Adam Ziska Jr  
By: Edwin B. H. Tower Jr Atty.

May 13, 1924.

A. ZISKA, JR 1,493,513

CLUTCH

Filed Oct. 4, 1919

Inventor
Adam Ziska, Jr
By Edwin B. H. Tower Jr
Atty.

Patented May 13, 1924.

1,493,513

UNITED STATES PATENT OFFICE.

ADAM ZISKA, JR., OF MILWAUKEE, WISCONSIN, ASSIGNOR TO HARLEY-DAVIDSON MOTOR CO., OF MILWAUKEE, WISCONSIN, A CORPORATION OF WISCONSIN.

CLUTCH.

Application filed October 4, 1919. Serial No. 328,455.

*To all whom it may concern:*

Be it known that I, ADAM ZISKA, Jr., a citizen of the United States, residing at Milwaukee, in the county of Milwaukee and State of Wisconsin, have invented new and useful Improvements in Clutches, of which the following is a specification.

This invention relates to clutches.

An object of the invention is to combine a fly-wheel and clutch as a unit which may be readily mounted on a shaft for connection with the driving gear.

Another object is to arrange a clutch within a fly-wheel for direct connection with a driving gear.

Another object is to provide a clutch and fly-wheel which may be removed as a unit from the driving shaft without removing the gear therefrom.

A further object is to provide a simple form of clutch structure which may be readily manufactured.

Other objects will appear.

An embodiment of the invention is shown in the accompanying drawing.

Fig. 2 is a perspective view of the driven member of the clutch.

Fig. 3 is a perspective view of the herring bone gear of the power transmission train.

Fig. 5 is a perspective view of one of the driven disks of the clutch.

Figure 1:
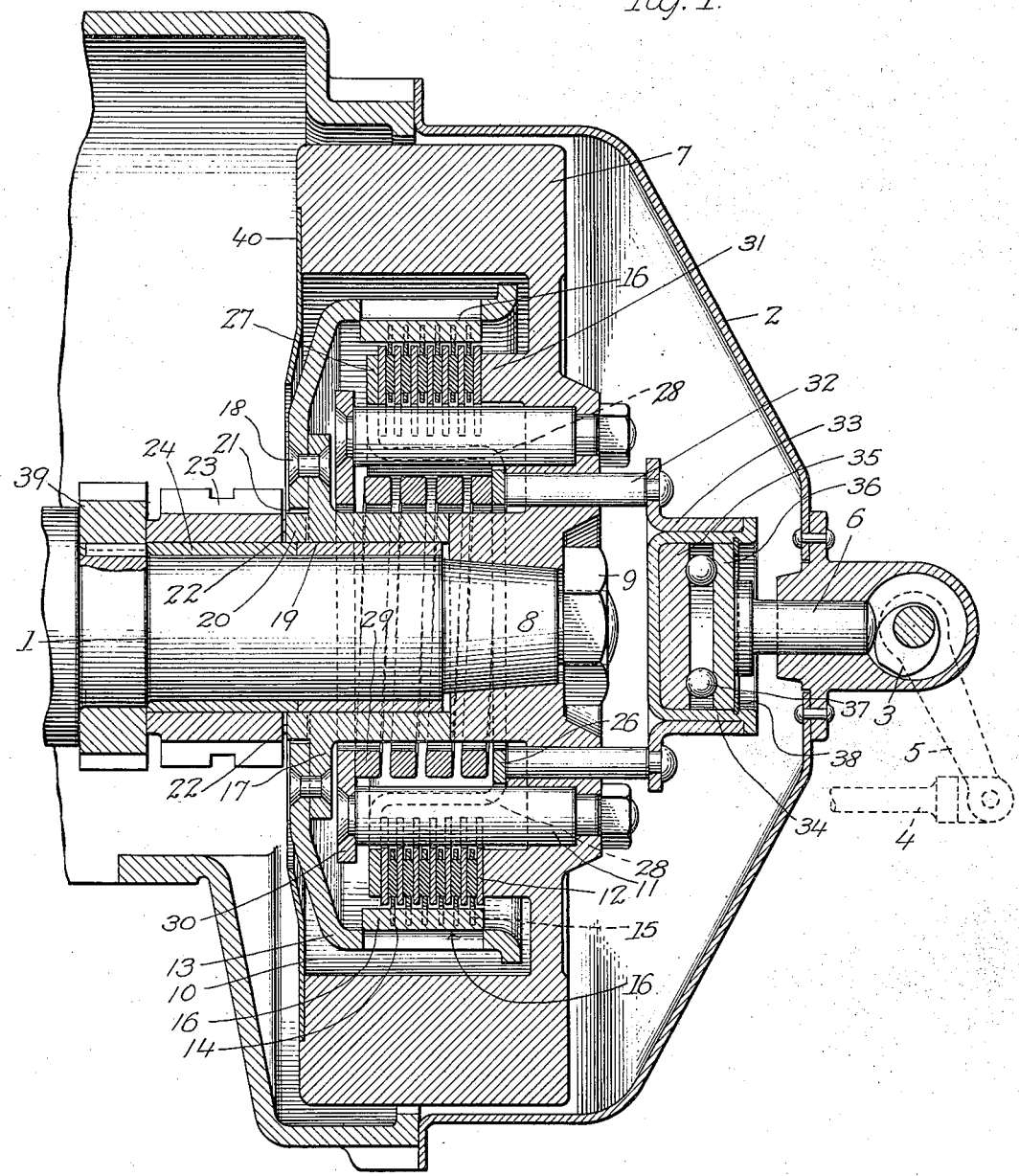
Fig. 1 is a vertical sectional view of the combined fly-wheel and clutch of a motor-cycle.

Fig. 1, showing the clutch in engaged position, will first be described. The clutch and fly-wheel are mounted upon the engine shaft 1 and are contained within a housing 2. The clutch operating mechanism consists of a cam 3 which is operated by means of a rod 4 and lever 5 from outside of the casing. The cam 3 actuates a pin 6 which transmits the motion to the clutch mechanism. When it is desired to inspect the mechanism the housing 2 may be removed, carrying with it the clutch operating mechanism.

The fly-wheel 7 is mounted upon the engine shaft 1 and secured in position by having its conically bored central portion forced upon the cone shaped end 8 of the engine shaft 1 and held in position thereon by means of a nut 9 threaded upon a reduced portion of the shaft 1. An annular cavity 10 is provided within the fly-wheel 7 and within this cavity the main portion of the clutch mechanism is mounted.

The driving member of the clutch comprises the fly-wheel 7 having shouldered pins 11 mounted thereon, and the driving disks 12 which are cut out to engage these pins 11 and are driven by such pins. The driven member of the clutch comprises the cup shaped member 13 and the driven disks 14 which are provided with friction lining inserts and are notched at 15 to engage projections 16 formed upon the inner portion of the driven cup shaped member 13. This driven portion of the clutch comprises, further, the hub 17 which is riveted at 18 to the member 13 and is provided with a bushing 19 which loosely rides upon the shaft 1. The hub 17 has teeth 20 formed at its forward portion which project through an opening 21 in the member 13 and engage corresponding teeth 22 formed upon the herring bone gear 23. This herring bone gear 23, provided with a bushing 24 which loosely rides upon the shaft 1, is the first gear in the gear train which transmits the energy of the engine to the rear wheel of the motor-cycle.

Figs. 2 and 3 show the herring bone gear 23 and the driven member 13 of the clutch with their axes in alignment and indicate the manner in which the teeth 20 engage the teeth 22.

Figure 4:
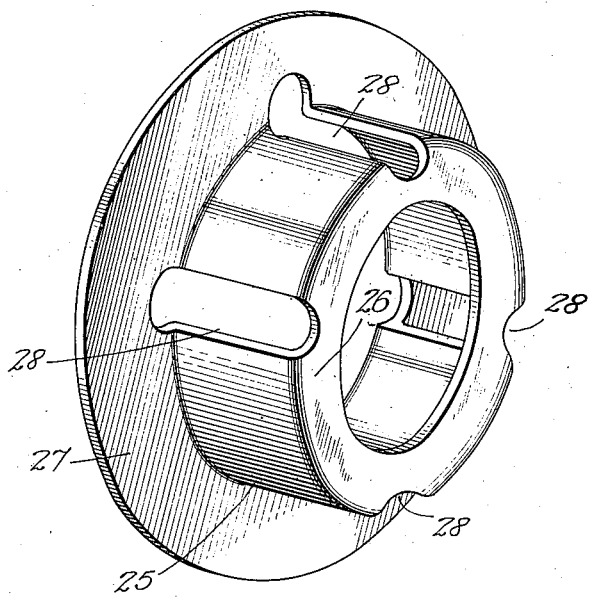
Fig. 4 is a perspective view of the flanged cup shaped clamping member of the clutch.
Figure 6:
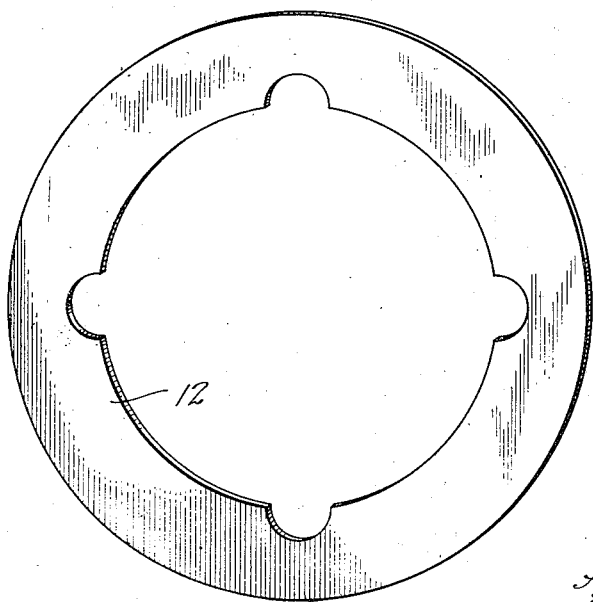
Fig. 6 is a perspective view of one of the driving disks of the clutch.

Fig. 4 shows the cup shaped, flanged, clamping member which is provided with a cylindrical portion 25, an open bottom portion 26 and a flanged upper portion 27. The cylindrical portion 25 and the flanged portion 27 are formed with openings 28 through which the pins 11 project and by means of which this member is positioned in the clutch.

Fig. 1 shows the position of the clamping member in the clutch. This member is adapted to rotate with the driving portion of the clutch. A helical spring 29 bears at one end upon an annular ring 30, to which are riveted the pins 11, and at its other end upon the inner flange 26 of the cup shaped member. The pressure of this spring is transmitted through the cup shaped member to the driving and driven disks which are clamped between the upper flange 27 of this cup shaped member and annular projection 31 formed upon the fly-wheel and projecting into the cavity 10. This spring 29 serves to hold the disks in driving, frictional engagement with each other.

Pins 32 pass through openings in the rear portion of the fly-wheel and engage the flange 26 of the cup shaped member. The rear ends of these pins are riveted to a flanged member 33 which carries a cup shaped member 34. This cup shaped member 34 carries the thrust bearing plates 35 and 36 and, between them, the balls 37. The plate 36 is loosely held within the cup shaped member 34 by means of a washer 38.

In order to prevent oil from the interior of the clutch from finding its way outwardly into the engine casing an annular ring 40 is secured upon the fly-wheel 7 and thereby forms an oil guard.

The operation of the clutch is as follows: When it is desired to release the clutch the arm 5 of the clutch operating mechanism is moved in a clock-wise direction by means of the rod 4 and causes the cam 3 to force the pin 6 inwardly. This inward motion of the pin is transmitted through the thrust bearing, the members 34 and 33, and the pins 32, to the cup shaped member 25 and causes such member to move inwardly, thereby compressing the spring 29 and moving the flange 27 forwardly and relieving the driving and driven disks of the clamping pressure of the spring 29. Thereupon the fly-wheel and driving portion of the clutch rotate free of engagement with the driven portion of the clutch.

When it is desired to throw these driving and driven parts of the clutch into operative engagement, the lever 5 is moved in a counter-clockwise direction thereby again placing the parts in the position illustrated in Fig. 1 and causing the driving and driven disks to be resiliently hald in frictional engagement.

When it is desired to dismantle this clutch and fly-wheel the housing 2 is removed carrying with it the members of the clutch operating mechanism comprising the cam 3 and the pin 6. The nut 9 is unscrewed, and the fly-wheel and clutch are removed as a unitary structure from the engine shaft 1, the teeth 20 freely disengaging the teeth 22 of the herring bone gear 23. The reason for providing this detachable engagement, as secured by the teeth 20 and 22, is to allow the fly-wheel and clutch to be removed without necessitating the removal of the herring bone gear 23, as this gear 23, because of the double angular arrangement of its teeth, cannot be moved lengthwise on shaft 1. and out of engagement with the cooperating gear of the power transmitting train.

The removal or replacement of the fly-wheel and clutch does not disturb either the herring bone gear 23, which is loosely mounted upon the engine shaft 1, or pinion 39 which is keyed to the engine shaft 1 and forms the first gear in the cam shaft train.

Obviously other structures may be devised which will embody the invention herein set forth.

What I claim is:

1. A detachable clutch and fly-wheel forming a unit for application to and removal from a shaft, comprising a hollow fly-wheel fixed to the shaft and forming the driving member of the clutch, a driven clutch member located within the fly-wheel and freely rotatable on the shaft, a spring actuated clamping plate carried by one of the clutch members, a disk gripped between the clamping plate and such clutch member, the disk and other clutch member being connected to rotate together, the fly-wheel and clutch parts being removable as a unit from the shaft.

2. A detachable clutch and fly-wheel comprising a hollow fly-wheel fixed to a shaft and forming the driving member of the clutch, a clutch driven member located within the fly-wheel and freely rotatable upon the same shaft, a spring pressed clamping plate carried by one clutch member, a disk connected to the other clutch member so as to rotate therewith and located between the clamping plate and the clutch member carrying the same so as to be gripped therebetween, and a power transmitting element mounted on the shaft and having detachable engagement with the driven clutch member, the fly-wheel and the clutch parts being removable as a unit from the shaft.

3. A detachable clutch and fly-wheel comprising a hollow fly-wheel, a clutch mounted therein having driving and driven members, a shaft upon which said fly-wheel is mounted, a pinion freely mounted upon said shaft, and cooperating teeth formed upon the driven member of said clutch and said pinion.

4. In combination, a hollow fly-wheel adapted to be mounted on a shaft to rotate therewith and forming the driving member of a clutch, a driven clutch member located within the fly-wheel and having a hub mounted on the shaft in alinement with the fly-wheel hub and freely rotatable on the shaft, a spring pressed clamping plate located within and carried by the fly-wheel, and a disk to be gripped between the clamping plate and fly-wheel, the disk and driven member being connected to rotate together, the fly-wheel and clutch parts located therein being removable as a unit from the shaft.

5. A detachable clutch and fly-wheel, comprising a hollow fly-wheel, a clutch having driving and driven members mounted within said fly-wheel, a pinion having detachable engagement with said driven member, and means for operating said clutch extending through the face of the fly-wheel.

6. In a combined detachable clutch and fly-wheel the combination of an engine shaft, a hollow fly-wheel detachably mounted thereon, a clutch having driving and driven members positioned within said fly-wheel, a pinion loosely mounted upon said shaft, and cooperating teeth formed upon said driven member and said pinion whereby said fly-wheel and clutch may be removed without removing said pinion.

7. A combined clutch and fly-wheel comprising a hollow fly-wheel having a clutch mounted therein, said clutch having a plurality of driving and driven disks, said driving disks being connected to said fly-wheel, a driven member to which said driven disks are connected, a spring for holding said driving and driven disks in frictional engagement, means for disengaging the said driving and driven disks comprising members extending through said fly-wheel, and a cam for actuating said members.

8. In a motor-cycle the combination of an engine shaft, a fly-wheel detachably mounted thereon, a clutch mounted within the fly-wheel and forming a unitary structure with said fly-wheel, and a pinion detachably connected with said clutch whereby said clutch and fly-wheel may be detached as a unit from the motor-cycle.

9. In a motive mechanism of a vehicle, the combination of a motor shaft, a fly-wheel detachably secured to said shaft, a clutch having driving and driven members carried by said fly-wheel, said clutch and fly-wheel forming a unitary structure, a pinion loosely mounted upon said shaft, and means for detachably connecting said pinion and the driven member of the clutch.

10. In a motor driven vehicle, the combination of a shaft, a pinion freely mounted thereon, a detachable clutch comprising a driving member detachably mounted upon said shaft and a driven member rotatably mounted upon said shaft, and means for detachably connecting said pinion and driven member whereby said clutch may be removed as a unit from said vehicle without removing said pinion.

11. In combination an engine shaft, a fly-wheel, a friction clutch contained within the fly-wheel, and a gear on the engine shaft detachably connected with said clutch.

12. In combination an engine shaft, a fly-wheel supported thereon, friction clutch members contained in said fly-wheel, a spring for holding the clutch members in frictional engagement, means extending through said fly-wheel to render the spring ineffective, and means for actuating said last mentioned means.

In witness whereof, I have hereunto subscribed my name.

ADAM ZISKA, Jr.